United States Patent
Tauchi

(10) Patent No.: US 7,565,241 B2
(45) Date of Patent: Jul. 21, 2009

(54) AUTOMOBILE NAVIGATION SYSTEM AND ROAD MAP UPDATE SYSTEM

(75) Inventor: Nobutaka Tauchi, Toyoake (JP)

(73) Assignee: DENSO CORPORATION, Kariya (JP)

( * ) Notice: Subject to any disclaimer, the term of this patent is extended or adjusted under 35 U.S.C. 154(b) by 463 days.

(21) Appl. No.: 11/253,702

(22) Filed: Oct. 20, 2005

(65) Prior Publication Data

US 2006/0111837 A1 May 25, 2006

(30) Foreign Application Priority Data

Nov. 22, 2004 (JP) ............................. 2004-338003
Aug. 4, 2005 (JP) ............................. 2005-227062

(51) Int. Cl.
*G01C 21/32* (2006.01)
(52) U.S. Cl. ................... 701/208; 701/209; 701/210; 340/995.14; 340/995.18
(58) Field of Classification Search .......... 701/208–210
See application file for complete search history.

(56) References Cited

U.S. PATENT DOCUMENTS

| | | | | |
|---|---|---|---|---|
| 4,891,761 | A * | 1/1990 | Gray et al. ................... | 701/219 |
| 4,982,332 | A * | 1/1991 | Saito et al. ................... | 701/208 |
| 5,488,559 | A * | 1/1996 | Seymour ..................... | 701/208 |
| 5,908,464 | A * | 6/1999 | Kishigami et al. ........... | 701/208 |
| 6,049,753 | A * | 4/2000 | Nimura ....................... | 701/201 |
| 6,119,066 | A * | 9/2000 | Sugiura et al. .............. | 701/208 |
| 6,125,323 | A | 9/2000 | Nimura et al. | |
| 6,202,024 | B1 * | 3/2001 | Yokoyama et al. .......... | 701/207 |
| 6,263,276 | B1 * | 7/2001 | Yokoyama et al. .......... | 701/207 |
| 6,542,816 | B1 * | 4/2003 | Ito et al. ...................... | 701/209 |
| 6,615,135 | B2 * | 9/2003 | Davies ........................ | 701/213 |
| 6,708,113 | B1 * | 3/2004 | Von Gerlach et al. ....... | 701/210 |
| 6,853,906 | B1 * | 2/2005 | Michi et al. ................. | 701/207 |
| 2001/0027375 | A1 * | 10/2001 | Machida et al. ............. | 701/209 |
| 2002/0177950 | A1 * | 11/2002 | Davies ........................ | 701/213 |
| 2004/0133343 | A1 * | 7/2004 | Hashida et al. ............. | 701/208 |
| 2005/0102098 | A1 * | 5/2005 | Montealegre et al. ....... | 701/209 |
| 2005/0222768 | A1 * | 10/2005 | Tauchi et al. ................ | 701/214 |
| 2006/0106534 | A1 * | 5/2006 | Kawamata et al. .......... | 701/208 |

(Continued)

FOREIGN PATENT DOCUMENTS

JP          A-6-88732       3/1994

(Continued)

OTHER PUBLICATIONS

Pending U.S. Appl. No. 11/093,994, filed Mar. 31, 2005, Tauchi et al.

*Primary Examiner*—Shelley Chen
(74) *Attorney, Agent, or Firm*—Posz Law Group, PLC

(57) ABSTRACT

A navigation system in a vehicle stores position history information including position information related to a detection position detected by a position detector and position information related to a map matching position. The map matching position is obtained by matching the detection position with a point of a road in road map data. When the vehicle runs on a not-stored road that is not stored in the road map data, the navigation system determines a trail of running of the vehicle from departure from a stored road that is stored in the road map data to comeback into a stored road that is stored in the road map data, based on the stored position history information.

13 Claims, 7 Drawing Sheets

U.S. PATENT DOCUMENTS

| | | | |
|---|---|---|---|
| 2006/0111837 A1* | 5/2006 | Tauchi | 701/210 |
| 2006/0217879 A1* | 9/2006 | Ikeuchi et al. | 701/208 |
| 2008/0120171 A1* | 5/2008 | Ikeuchi et al. | 705/13 |

FOREIGN PATENT DOCUMENTS

| | | |
|---|---|---|
| JP | A-7-270170 | 10/1995 |
| JP | A-8-271272 | 10/1996 |
| JP | A-9-33267 | 2/1997 |
| JP | A-2000-207674 | 7/2000 |
| JP | A-2002-54934 | 2/2002 |

* cited by examiner

AUTOMOBILE NAVIGATION SYSTEM AND ROAD MAP UPDATE SYSTEM

CROSS REFERENCE TO RELATED APPLICATIONS

This application is based on and incorporates herein by reference Japanese Patent Applications No. 2004-338003 filed on Nov. 22, 2004 and No. 2005-227062 filed on Aug. 4, 2005.

FIELD OF THE INVENTION

The present invention relates to an automobile navigation system and a road map delivery system wherein, when a vehicle runs on a road not contained in road map data, its trail of running can be obtained with accuracy and the new road can be added to the road map data utilizing the trail of running.

BACKGROUND OF THE INVENTION

For example, Patent Document 1 discloses a driving position display device in which, once a vehicle runs on a newly constructed road, data on the road can be stored. This driving position display device determines whether road data corresponding to a trail of running of the relevant vehicle is included in map data or not. When it is not included, the trail of running of the relevant vehicle is stored as configuration of road and road data, and this stored data is displayed on a display device.

Patent Document 1: JP-H9-33267A

Techniques to determine the relevant vehicle position include radio navigation typified by GPS and self navigation in which the relevant vehicle position is measured based on mileage and traveling direction. However, whichever technique is adopted, the obtained relevant vehicle position contains a position-fix error. To cope with this, map matching is generally adopted in conventional automobile navigation systems to enhance the accuracy of the relevant vehicle position. Map matching is based on the assumption that a vehicle absolutely runs on a road. It is a process in which the obtained relevant vehicle position and its trail of running are fit to a road in proximity to the vehicle and the relevant vehicle position is corrected so that it agrees with a point on the most likely road.

However, this technique has a problem. When the relevant vehicle gets from a road contained in road map data onto a road not contained in the road map data, its position can be erroneously map-matched to a road contained in the road map data. For this reason, even when a history of map matching position obtained by map matching is used, road data that departs from the actual configuration of the road can be generated.

SUMMARY OF THE INVENTION

The present invention has been made with the foregoing taken into account. It is a first object of the present invention to provide an automobile navigation system in which, when a vehicle runs on a road not contained in road map data, its trail of running can be obtained with accuracy.

It is a second object of the present invention to provide an automobile navigation system and a road map delivery system wherein road data approximate to the actual configuration of the road based on its trail of running.

To achieve the above objects, a navigation system in a vehicle is provided with the following. A display device is included. A position detector is included for detecting a position of the vehicle as a detection position. A map data storage unit is included for storing road map data. A map matching unit is included for performing map matching that matches, based on the detection position and the road map data, the detection position with a point of a road in the road map data, wherein the point is defined to be a map matching position. A display control unit is included for causing the display device to display the map matching position together with a road map based on the road map data. A history storage unit is included for storing position history information including position information related to the detection position and position information related to the map matching position. A determination unit is included for determining, when the vehicle runs on a not-stored road that is not stored in the road map data, a trail of running of the vehicle from departure from a stored road that is stored in the road map data to comeback into a stored road that is stored in the road map data, based on the position history information.

Under the above structure, a history storage unit stores history information related to the detection position and history information related to the map matching position. For this reason, comparison of these information makes it possible to easily and accurately determine, especially, a point at which a vehicle departs from a stored road and a point at which the vehicle comes back to a stored road. As a result, the trail of running of the vehicle from its departure from a stored road to its comeback to a stored road can be obtained with accuracy.

To achieve the above objects, as another aspect, a navigation system in a vehicle is provided with the following. A display device is included. A position detector is included for detecting a position of the vehicle as a detection position. Here, the position detector carries out at least two positioning types different in accuracy of (i) high-accuracy positioning relatively high and (ii) low-accuracy positioning relatively low. Further, a map data storage unit is included for storing road map data. A map matching unit is included for performing map matching that matches, based on the detection position and the road map data, the detection position with a point of a road in the road map data, wherein the point is defined to be a map matching position. A display control unit is included for causing the display device to display the map matching position together with a road map based on the road map data. A history storage unit is included for storing position history information, wherein (i) the position history information includes only position information related to the detection position when the high-accuracy positioning is carried out, and (ii) the position history information includes position information related to the detection position and position information related to the map matching position when the low-accuracy positioning is carried out. A determination unit is included for determining, when the vehicle runs on a not-stored road that is not stored in the road map data, a trail of running of the vehicle from departure from a stored road that is stored in the road map data to comeback to a stored road that is stored in the road map data, based on the position history information.

As mentioned above, when high-accuracy positioning is being carried out by the position detector, the history storage unit stores only position information related to the detection position from the high-accuracy positioning. Examples of high-accuracy positioning include RTK-GPS and VRS-GPS. Position-fix errors in the RTK-GPS and the VRS-GPS are between several centimeters and several tens of centimeters.

Therefore, a highly accurate trail of running can be determined based on the history of position information of the detection position from high-accuracy positioning. When high-accuracy positioning is being carried out, only position information of the detection position from that high-accuracy positioning is stored. Thus, the amount of data to be stored can be reduced.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
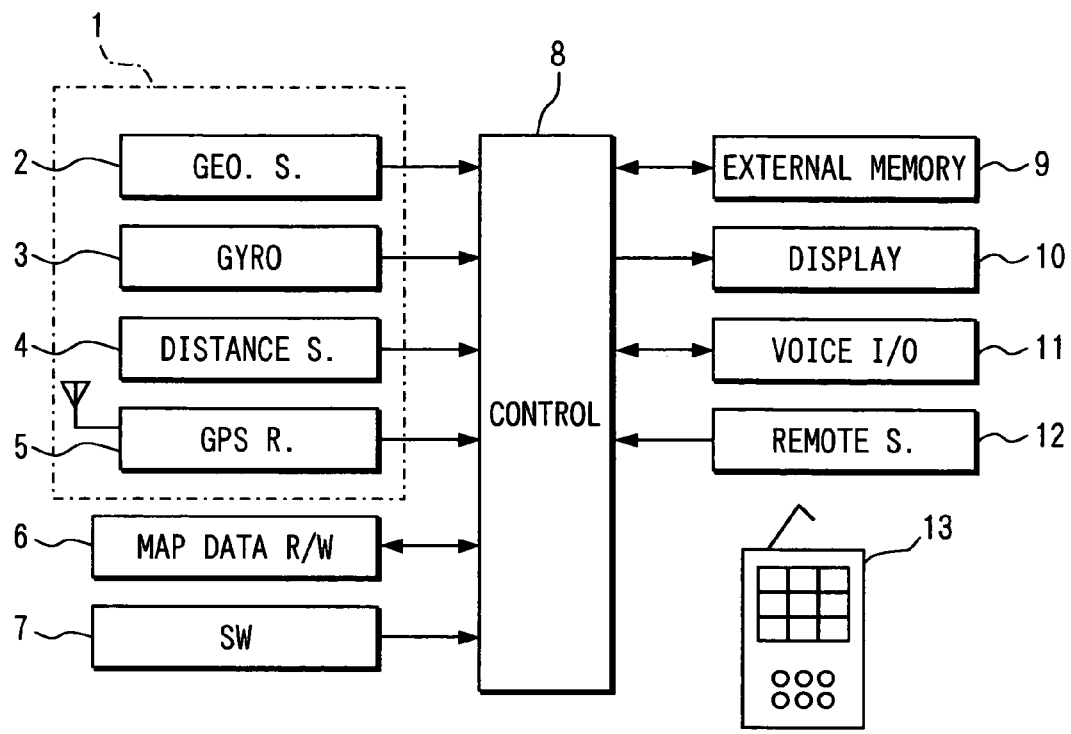
FIG. 1 is a block diagram illustrating the general configuration of an automobile navigation system in a first embodiment of the present invention.

Hereafter, description will be given to an automobile navigation system provided in a vehicle in an embodiment of the present invention with reference to the drawings. FIG. 1 is a block diagram illustrating the general configuration of an automobile navigation system in this embodiment.

As illustrated in the figure, the automobile navigation system in this embodiment comprises: a position detector 1; a map data R/W device 6; an operation switch group 7; a control circuit 8 connected with these components; and an external memory 9, a display device 10, a voice input/output device 11, and a remote sensor 12 connected with the control circuit 8.

The control circuit 8 is constructed as an ordinary computer, and is provided therein with publicly known CPU, ROM, RAM, and I/O and bus lines that connect these components. In the ROM, programs executed by the control circuit 8 are written, and the CPU and the like perform computation according to these programs.

The position detector 1 comprises a geomagnetic sensor 2, a gyro scope 3, a distance sensor 4, and a GPS receiver 5 for GPS (Global Positioning System) that detects the position of a vehicle based on radio waves from satellites. These components are all publicly known. These sensors and the like have errors different in property; therefore, the position detector is so constructed that it uses multiple sensors to complement them. That is, position information related to the relevant vehicle position is obtained by hybrid navigation in which radio navigation based on the GPS and self navigation using the geomagnetic sensor 2, gyro scope 3, and distance sensor 4 are combined together.

An example of hybrid navigation is as follows: while the relevant vehicle position is computed by self navigation, the relevant vehicle position is corrected based on the longitude and the latitude computed by radio navigation. Thus, the influences of errors in sensors on self navigation are eliminated.

The GPS receiver 5 in this embodiment can not only receive radio waves from satellites, but also carry out high-accuracy positioning, such as publicly known RTK (Real-Time Kinematic)-GPS positioning, VRS (Virtual Reference Station)-GPS positioning, or DGPS (Differential GPS) positioning, in which any GPS position-fix error is corrected through data communication with a fixed station as a reference point. That is, when radio waves from satellites are received by the GPS receiver 5 and data communication with a fixed station is carried out, the control circuit 8 in this embodiment can perform the following operation: it can carry out highly accurately fix the relevant vehicle position (high-accuracy positioning) based on an output signal from the position detector 1. In other cases, the relevant vehicle position is fixed with relatively low accuracy by the above-mentioned self navigation or hybrid navigation (low-accuracy positioning).

The map data R/W device 6 is a device for inputting map data, including road data, background data, and character data, to the control circuit 8, and for storing new road data when the road data is generated as described later. To read and write map data, a hard disk, DVD-RW, DVD-RAM, or the like is used as storage media for the map data R/W device 6.

Figure 2:
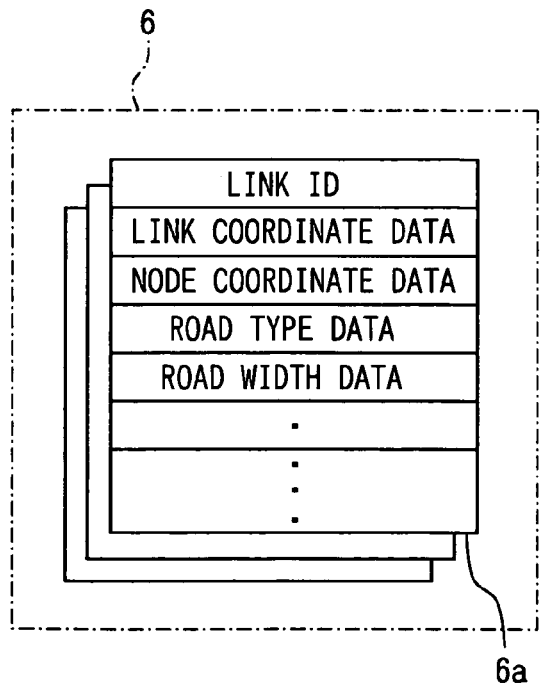
FIG. 2 is an explanatory drawing illustrating the data structure of road data.

Description will be given to the structure of road data with reference to FIG. 2. As illustrated in FIG. 2, road data 6a is comprised of varied data. Such data includes link ID that is a unique number assigned to each road; link coordinate data; node coordinate data; road type data that indicates the type of each road, such as expressway and national road; road width data; restriction data indicating one-way traffic and the like; and the like. Link in road data 6a is defined as follows: each road on a map is divided into multiple sections at nodes that indicate intersections, bifurcations, and the like, and the section between any two nodes is taken as a link. In link coordinate data, the coordinates of the start point and the end point of each link are described. In a case where a node is included in a link at some midpoint, the coordinates of the node is described in node coordinate data. In addition to displaying a map, the road data 6a is used to give the configuration of a road in map matching, to search for a guided route to a destination, and to accomplish other purposes.

Though not shown in the figure, the background data is constructed as data in which facilities, geographical features, and the like on a map are brought into correspondence with corresponding coordinates on the map. With respect to each facility, such data as phone numbers and address is also stored in correlation with the facility. The facility data may be stored in the external memory 9 described later. The character data is for displaying place names, facility names, road names, and the like over a map, and it is stored in correlation with coordinate data corresponding to the positions where they should be displayed.

For the operation switch group 7, for example, touch switches, mechanical switches, or the like integrated with the display device 10 described later are used. The operation switch group 7 is used for various inputs.

The external memory 9 is comprised of, for example, storage media, such as memory card and hard disk. The external memory 9 stores varied data, including text data, image data, and voice data, inputted by a user.

The display device 10 is comprised of, for example, a liquid crystal display. The screen of the display device 10 is capable of displaying a relevant vehicle position mark corresponding to the present position of the relevant vehicle and a road map of the area surrounding the relevant vehicle, generated from map data inputted from the map data R/W device 6. When a destination is set, a guided route from the present position to the destination can be displayed over the road map.

The voice input/output device 11 comprises a voice input device and a voice output device, neither of which is shown in the figure. The voice input device recognizes the contents of a user's speech, and is used for various inputs to the automobile navigation system. The voice output device comprises a speaker, an audio amplifier, and the like, and is used to provide audio guidance or the like.

The automobile navigation system in this embodiment is provided with a remote control terminal (hereafter, referred to as "remote") 13 and the remote sensor 12. Various navigation operations can be performed through this remote 13. For example, the remote can be used for the operations of setting for displaying a map, such as the scale of the map, the orientation of the map, and switch between double screen display and single screen display. In addition, when the position of a destination is inputted from the remote 13 or the operation switch group 7, the optimum route from the present position to that destination is automatically selected to form a guided route, and this guided route is displayed. When an address, a facility name, a phone number, or the like is inputted by the user, the position of the corresponding facility or the like is searched for.

These processes of display, search, and the like are performed by varied computation being carried out mainly by the control circuit 8. An example will be taken. When a destination is inputted, the control circuit 8 computes a route using map data from the map data R/W device 6, and causes the route to be displayed. In addition, it provides the zoom display of a road map or audio guidance at a bifurcation or an intersection at which a right turn or a left turn should be made.

Description will be given to a process in which the control circuit 8 causes the display device 10 to display the relevant vehicle mark indicating the position of the relevant vehicle and a road map of the surrounding area, with reference to FIG. 3. In this process, the relevant vehicle position, computed based on an output signal from the position detector 1, and a map matching position (or point), obtained by correcting the relevant vehicle position into a position or point on a road by map matching, described later, are stored. The relevant vehicle position and the map matching position are used for the following purpose when the relevant vehicle runs on a road not contained in map data: to obtain a trail of running corresponding to the configuration of that road with high accuracy. After a trail of running is obtained, road data is generated based on the trail of running and is stored in the map data R/W device 6.

Figure 3:
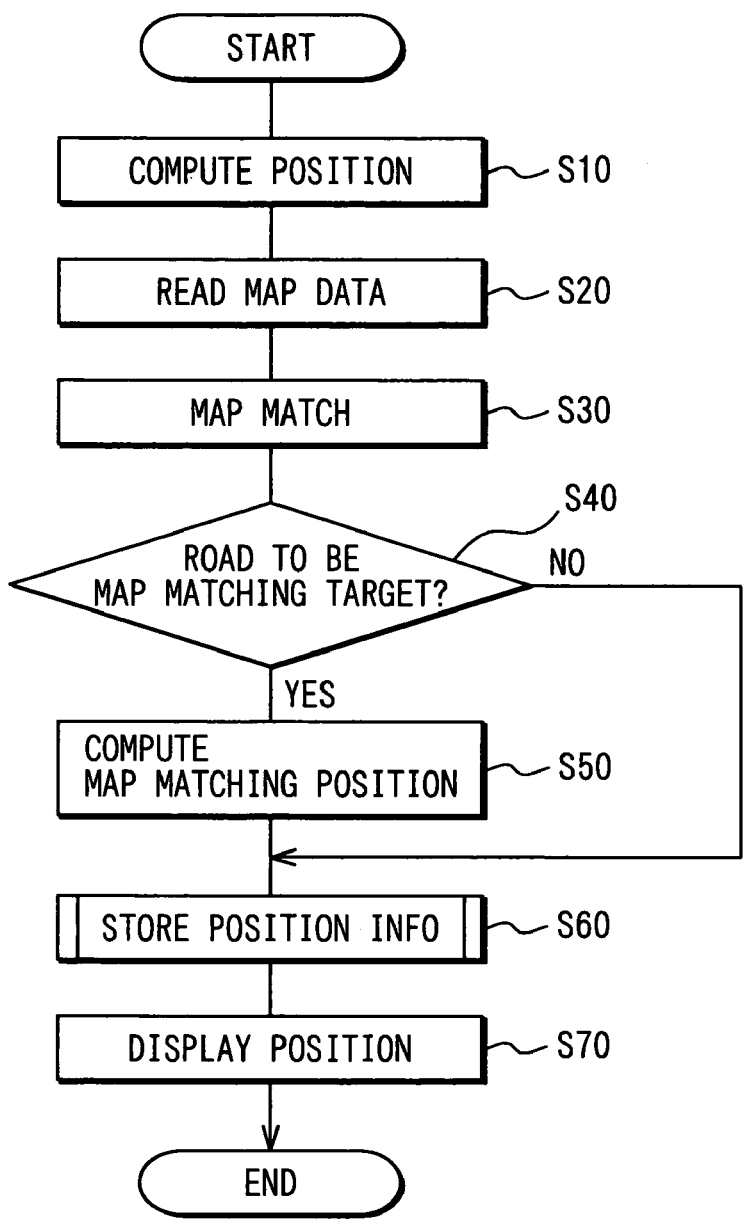
FIG. 3 is a flowchart illustrating a process to display a relevant vehicle mark and a road map of the surrounding area.

At Step S10 in FIG. 3, the relevant vehicle position is computed based on position data obtained through measurement by the sensors of the position detector 1. At this time, the position data from the GPS receiver 5 is acquired in the same form as the coordinate data (latitude and longitude) in the above-mentioned road data. Data related to the traveling direction and the mileage of the relevant vehicle is acquired by the geomagnetic sensor 2, gyro scope 3, and distance sensor 4. Then, coordinate data on the relevant vehicle position is computed relative to the relevant vehicle position computed or determined in the past (computation of coordinate data by self navigation).

When low-accuracy positioning is being carried out, the relevant vehicle position is basically determined based on coordinate data computed by self navigation. However, when position data from the GPS receiver 5 has been acquired, both are compared with each other. When the difference between them is a predetermined distance or greater, the position data from the GPS receiver 5 is adopted as the relevant vehicle position. Alternatively, in this case, the relevant vehicle position may be determined based on both position data by self navigation and position data from the GPS receiver 5.

When high-accuracy positioning is being carried out, the relevant vehicle position is basically determined based on coordinate data obtained through measurement by the GPS receiver 5. Coordinate data computed by self navigation is used to interpolate the difference between one piece of coordinate data and another from the GPS receiver 5.

At Step S20, map data on the area surrounding the relevant vehicle is read based on the coordinates of the relevant vehicle position computed at Step S10. At Step S30, map matching is carried out. In this map matching process, the following procedure is taken: when the relevant vehicle is on a road at a predetermined distance or shorter distance from the relevant vehicle position computed at Step S10 or when the relevant vehicle position has been already matched to a some point on a road, a road connected to that matching road is identified as a road on which the relevant vehicle is likely to run. Multiple present positions computed at Step S10 in the past and the latest present position are joined together to compute a trail of running. The configuration of the trail of running is compared with the configurations of roads on which the relevant vehicle is likely to run, and the road in the highest correlation is presumed to be the road on which the relevant vehicle is presently running.

At Step S40, it is determined in the above-mentioned map matching process whether a road to be a target of map matching exists in the stored map data or not. When it is determined at this time that a road to be a target of map matching exists, the operation proceeds to Step S50; when it is determined that a road to be a target of map matching does not exist, the operation proceeds to Step S60.

At Step S50, the configuration of the above-mentioned trail of running is fit to the road on which the relevant vehicle is presumed to be running by map matching to determine a map matching position. After the map matching position is determined as mentioned above, position data by self navigation is computed relative to this map matching position and the like.

At Step S60, the relevant vehicle position and the map matching position corresponding to that relevant vehicle position are paired with each other, and position information related to these positions is stored. This process to store position information will be described in detail later.

When a map matching position has been determined, at Step S70, the relevant vehicle position mark is displayed in a position corresponding to that map matching position. Further, display data for displaying a road map of the surrounding area is generated, and the relevant vehicle position mark and the road map of the surrounding area are displayed on the display device 10 using that display data.

When a road to be a target of map matching is not contained in road map data and thus no map matching position has been determined, the relevant vehicle position mark is displayed in a position corresponding to the relevant vehicle position computed at Step S10. At the same time, a road map of the surrounding area read at Step S20 is displayed together. Therefore, in a case where the relevant vehicle runs on a road that is newly constructed and is not contained in map data, the following procedure is taken: the relevant vehicle position mark is not matched to some point on a road, and it is displayed in a position corresponding to the computed relevant vehicle position.

Detailed description will be given to the above-mentioned process to store position information with reference to the flowchart in FIG. 4.

Figure 4:
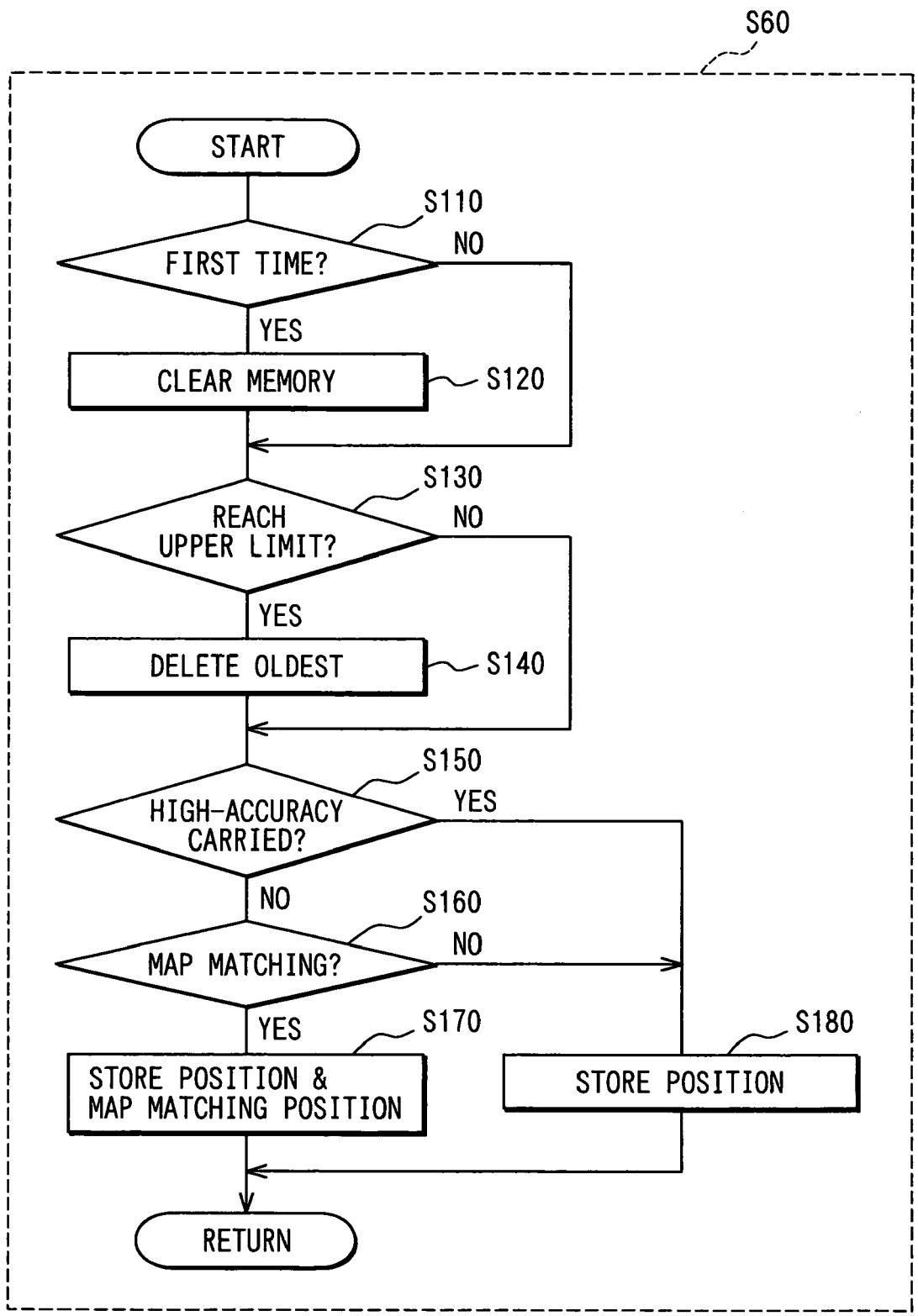
FIG. 4 is a flowchart illustrating a process to store position information on the relevant vehicle.

At Step S110 in FIG. 4, it is determined whether the process to store position information is carried out for the first time since the navigation system was started up. When it is determined at this step that the process to store position information is carried out for the first time, the position history information stored in memory is all cleared at Step S120. As the memory to store position information (or position history information), the internal memory of the control circuit 8 or the external memory 9 is used.

At Step S130, it is determined whether the data amount of position information stored in memory has reached an upper limit value. When it is determined that the amount of data has reached the upper limit value, the chronologically oldest position information data is deleted at Step S140.

When a vehicle starts running on a road not contained in map data cannot be predicted. For this reason, the relevant vehicle position and the map matching position must be constantly stored in memory when the vehicle is running. However, a memory of extremely large capacity is required to store the history of all the relevant vehicle positions and the map matching positions since the vehicle starts running. To cope with this, this embodiment takes the following measures: the value of capacity for storing position information on relevant vehicle positions and map matching positions is defined; when the data amount of the position information reaches the upper limit value of the capacity value, the oldest position information data is deleted. Thus, even when a vehicle runs over a long distance or for a long time, only the predetermined amount of position information is stored in memory. This prevents a memory capacity for storing position information from being excessively enlarged.

At Step S150, it is determined whether the above-mentioned high-accuracy positioning is being carried out in the automobile navigation system. When it is determined at Step S150 that high-accuracy positioning is being carried out, the operation proceeds to Step S180. At Step S180, only position information related to the relevant vehicle position measured by high-accuracy positioning is stored as position information. In case high-accuracy positioning is carried out, as mentioned above, position-fix errors with respect to the relevant vehicle position are between several centimeters and several tens of centimeters. Therefore, the trail of running of the relevant vehicle can be determined with accuracy based on a history of position information on the relevant vehicle position by high-accuracy positioning. In case high-accuracy positioning is being carried out, only position information on the relevant vehicle position by that high-accuracy positioning is stored. As a result, the amount of data to be stored can be reduced.

When it is determined at Step S150 that high-accuracy positioning is not being carried out, the operation proceeds to Step S160. Then it is determined whether a map matching position has been computed with any of the roads contained in the map data stored in the map data R/W device 6 taken as a target of map matching. When it is determined at Step S160 that no map matching position has been computed, the operation proceeds to Step S180 mentioned above. Then, only position information related to the relevant vehicle position determined by low-accuracy positioning is stored. When it is determined at Step S160 that a map matching position has been computed, the operation proceeds to Step S170. Then, the relevant vehicle position determined by low-accuracy positioning and a map matching position corresponding to that relevant vehicle position, computed at Step S50 in FIG. 3, are paired with each other, and position information related to these positions is stored.

In this embodiment, as mentioned above, both position information related to the relevant vehicle position and position information related to a map matching position are stored. Therefore, a point at which the relevant vehicle departs from a stored road contained in map data and a point at which it comes back to a stored road can be easily and accurately determined. Especially, since the relevant vehicle position and the map matching position corresponding to that relevant vehicle position are stored in pair, these pieces of position information can be easily compared with each other to determine a point of departure and a point of comeback. As a result, a trail of running of a vehicle from its departure from a stored road to its comeback to a stored road can be determined with accuracy.

Figure 6:
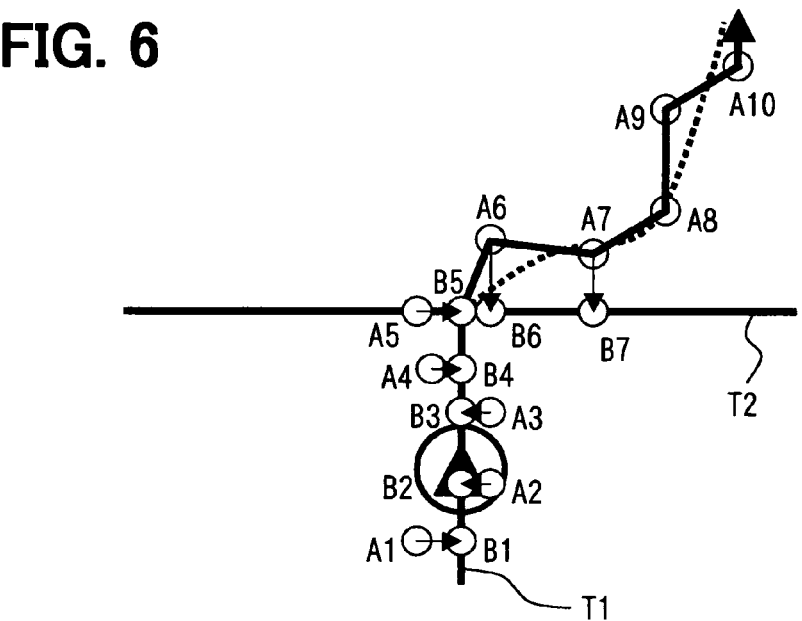
FIG. 6 is an explanatory drawing for explaining a method for generating road data.

Description will be given to a method for determining a point at which the relevant vehicle departs from a stored road contained in map data based on position information related to the relevant vehicle position and position information related to a map matching position, with reference to FIGS. 6 and 7A to 7C. FIG. 6 shows an example in which the relevant vehicle runs on road T1 toward a T-shaped intersection, and starts running on a road not contained in map data at the T-shaped intersection.

As illustrated in FIG. 6, the relevant vehicle positions A1 to A5 computed based on position data obtained through measurement by the sensors of the position detector 1 when the vehicle is running on road T1 toward the T-shaped intersection do not agree with road positions because of position-fix errors. Therefore, the map matching positions B1 to B5 in agreement with road positions are computed by map matching.

The relevant vehicle arrives at the T-shaped intersection, and starts running on a road not contained in map data at the T-shaped intersection. In this case, immediately after the relevant vehicle departs from the stored road, a map matching position may be computed so that it agrees with some point on a road in proximity to the relevant vehicle. This embodiment takes the following procedure: position information on the relevant vehicle position to be adopted for a trail of running is accepted or rejected according to the differential angle $\Delta\theta$ between the traveling direction determined from position information related to the relevant vehicle position and a road that was a target of map matching. Thus, the point at which the relevant vehicle departed from the stored road is determined, and further a trail of running corresponding to road data is determined.

Varied information can be used as the traveling direction determined from position information related to the relevant vehicle position. For example, position information immediately before and after the vehicle departs from the stored road may be used. That is, in the example illustrated in FIG. 6, the traveling direction from position B5 immediately before departure from the stored road to position A6 immediately after departure may be used. Or, the traveling direction to the relevant vehicle positions A7 and A8 determined in the second place or in the third place after departure may be used. Or, the average value of them may be worked out and the direction corresponding to the obtained average value may be taken as the traveling direction. Further, to facilitate the computation of traveling direction, azimuth information based on the output of the geomagnetic sensor 2 or the gyro scope 3 may be stored together as position information related to the relevant vehicle position.

Figure 7A:
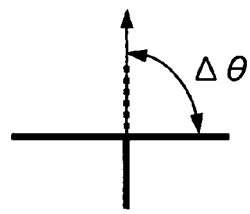
FIGS. 7A, 7B, and 7C are explanatory drawings showing variations of the way a road is connected to the T-shaped intersection illustrated in FIG. 6.

In a case where the differential angle Δθ between the traveling direction of the relevant vehicle from the T-shaped intersection and a road in proximity to the relevant vehicle is more than 80 degrees, for example, and close to a right angle, as illustrated in FIG. 7A, the following procedure is taken: though the intersection in map data is a T-shaped intersection, it can be presumed that it is actually a cross intersection. In this case, the shape of the intersection can be erroneously taken as the shape of other than cross intersection because of position-fix errors in several relevant vehicle positions A6 and A7 immediately after departure from the stored road. Or, the map matching positions B6 and B7 can be utilized to determine a trail of running. To prevent these situations, the relevant vehicle positions A6 and A7 are thinned out. Then, a line segment that connects the map matching position B5 and the relevant vehicle position A8 obtained after the relevant vehicle positions A6 and A7 are thinned out is determined with the map matching position B5 in FIG. 6 taken as a point of departure. This line segment is the starting portion of the trail of running corresponding to road data, to be determined. Then, line segments that connect the relevant vehicle positions A8, A9, A10, . . . in succession are determined as the remaining portion of the trail of running.

Figure 7B:
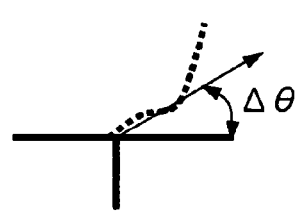

In a case where the differential angle Δθ between the traveling direction of the relevant vehicle from the T-shaped intersection and a road in proximity to the relevant vehicle is, for example, not less than 10 degrees and less than 80, as illustrated in FIG. 7B, the following can be presumed: a road not contained in map data slantly extends from the T-shaped intersection. In this case, therefore, the trail of running is determined using several relevant vehicle positions A6 and A7 immediately after departure from the stored road with the map matching position B5 in FIG. 6 taken as a point of departure. That is, the line segments that connect the relevant vehicle positions A6, A7, A8, . . . in succession from the map matching position B5 are determined as the trail of running.

Figure 7C:
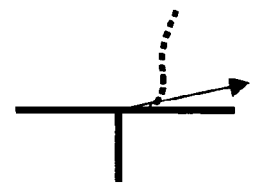

In a case where the differential angle Δθ between the traveling direction of the relevant vehicle from the T-shaped intersection and a road in proximity to the relevant vehicle is, for example, less than 10 degrees, as illustrated in FIG. 7C, the following can be presumed: the vehicle turns to the right from road T1 at the T-shaped intersection, runs on road T2 connecting to the T-shaped intersection, and then starts running on a road not contained in map data. In this case, the position B7 of map matching to road T2 connecting to the T-shaped intersection is taken as the point of departure from the stored road; and line segments that connect the relevant vehicle positions A8, A9, A10, . . . in succession from this map matching position B7 are determined as the trail of running.

As mentioned above, the point of departure from a stored road is determined based on the differential angle Δθ between the orientation of a stored road in proximity to the relevant vehicle, to be a target of map matching last, and the traveling direction determined from position information related to the relevant vehicle position. Thus, the point of departure from a stored road can be determined with accuracy, and as a result, the accuracy of a trail of running corresponding to road data is enhanced.

Figure 8:
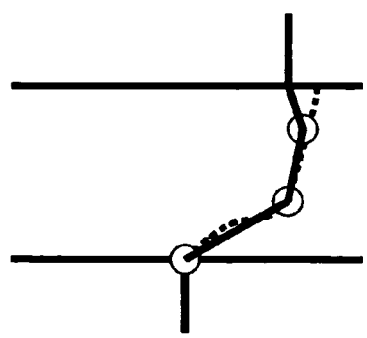
FIG. 8 is an explanatory drawing illustrating a situation in which the relevant vehicle departs from a stored road contained in map data and comes back to another stored road.

FIG. 8 illustrates a situation in which the relevant vehicle departs from a stored road contained in map data and comes back to another stored road. This point of comeback can also be determined by the same method as for the above-mentioned determination of point of departure. More specific description will be given. In the example illustrated in FIG. 8, the angle between the orientation of a stored road at the point of the relevant vehicle's comeback and the traveling direction of the relevant vehicle is close to 90°. Therefore, a relevant vehicle position immediately before comeback to a stored road is thinned out. Thus, the trail of running and the stored road are prevented from becoming discontinuous to each other.

Description will be given to a method for computing a trail of running corresponding to road data when high-accuracy positioning is being carried out in an automobile navigation system. As mentioned above, position-fix errors in high-accuracy positioning are very small. Therefore, a very highly accurate trail of running can be basically obtained by determining line segments that connect relevant vehicle positions obtained by high-accuracy positioning.

However, a road map drawn based on map data may shift from an actual road map and have an error sometimes. When a road is newly added to such a road map having an error, the road map can become discontinuous unless road data is so generated that it has the same error.

Figure 9:
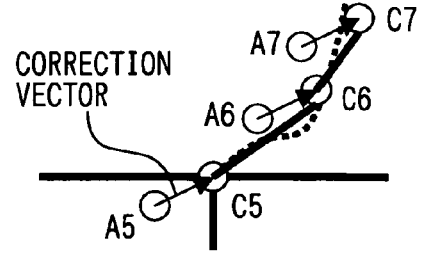
FIG. 9 is an explanatory drawing for explaining a method for computing a trail of running corresponding to road data when high-accuracy positioning is being carried out in an automobile navigation system.

To cope with this, this embodiment takes such a procedure as illustrated in FIG. 9 where the relevant vehicle position A5 by high-accuracy positioning is corrected by map matching into the map matching position C5 when high-accuracy positioning is being carried out. That is, the difference between the relevant vehicle position A5 and the map matching position C5 is computed as a correction vector. Relevant vehicle positions A6, A7, . . . obtained by high-accuracy positioning are shifted by an amount equivalent to the correction vector to determine corrected positions C6, C7, . . . Then, line segments that connect the corrected positions C6, C7, . . . in succession from the map matching position C5 are determined as the trail of running. Thus, even when map data contains any error, a trail of running can be determined so that it is continuous to a road in the map data. Therefore, road data can be added without producing a discontinuous portion or the like by generating road data based on this trail of running.

Figure 5:
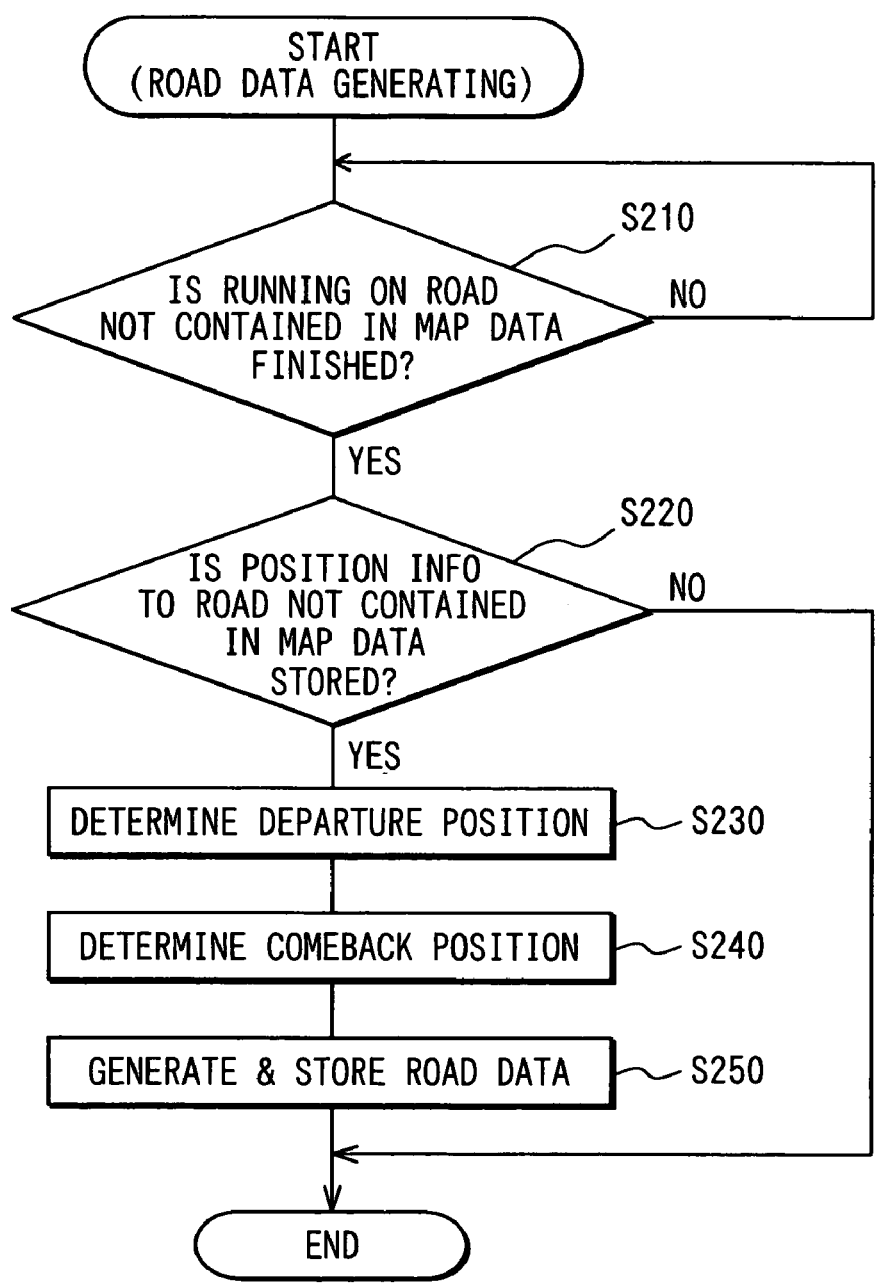
FIG. 5 is a flowchart illustrating a process to generate road data based on the stored position information on the relevant vehicle.

Description will be given to a process to generate road data with reference to the flowchart in FIG. 5. At Step S210, it is determined whether the relevant vehicle has finished running on a road not contained in map data. Specifically, it is determined that the vehicle has finished running on a road not contained in map data, in the following cases: when the relevant vehicle position of the relevant vehicle agrees with the position of some point on a stored road; and when the configuration of the trail of running of the relevant vehicle agrees with the configuration of a stored road. When it is determined at Step S210 that the running has finished, the operation proceeds to Step S220.

At Step S220, it is determined whether the history of position information corresponding to the whole of the road not contained in map data is stored in memory. This determination can be made based on the following, for example: whether a map matching position before it is determined that there is no road to be a target of map matching is stored or not; whether the stored position information on the relevant vehicle position contains position information matched with the position of a road from which the relevant vehicle departed; or the like. When it is determined that position information corresponding to the whole of a road not contained in map data is stored in memory, the operation proceeds to Step S230.

At Step S230, the point at which the relevant vehicle departed from the stored road is determined by the above-mentioned determination method. At Step S240, the point at which the relevant vehicle came back to the stored road is determined.

When position information on the relevant vehicle position by high-accuracy positioning is stored, that position information on the relevant vehicle position by high-accuracy positioning is used as the trail of running between the stored roads without change as long as there is no error in map data. Therefore, the point at which the trail of running branched from the stored road is determined as the point of departure, and the point at which it joined to the stored road is determined as the point of comeback.

At Step S250, road data is generated from the trail of running determined based on the point of departure and the point of comeback determined at Step S230 and Step S240 and position information on the section between them. Specifically, road data is generated taking the point of departure and the point of comeback as nodes and the section between them as a link. However, in a case where position information on the section between the point of departure and the point of comeback cannot be considered to be a straight line, one or more nodes are established between them. Thus, road data analogous to the actual configuration of the road as much as possible is generated. The generated road data is stored in the map data R/W device 6, and the process is terminated.

Restriction information on one-way traffic indicating that the relevant road is trafficable only in the direction in which the relevant vehicle ran is added to the link data in the thus generated road data. This is because it cannot be determined whether a road is trafficable in two ways by the relevant vehicle running on the road only once. When the relevant vehicle runs on a road corresponding to the generated road data in the opposite direction, the restriction information on one-way traffic is cleared.

In addition to the attribute related to trafficable direction, the attribute related to link cost is also added to the link data in the generated road data. This link cost can be set based on the time it took to run throughout a link in the generated road data, or the (average) speed at which the vehicle ran on the link. In addition, the link cost in the generated road data can be set in contrast with the link cost, running speed, and running time with respect to a previously stored road connected to the road on which road data was generated. An example will be taken. It will be assumed that the link cost of a stored road connecting to a road on which road data was generated is 2 and its average running speed is 30 km/h. In this case, when the average running speed in the link in the generated road data is 30 km/h, the link cost in the generated road data is set to 2.

(Modifications)

In the above-mentioned embodiment, road data is generated when position information corresponding to the whole of a road not contained in map data is stored in memory. In addition, road data may be generated when the relevant vehicle departs from a stored road and runs a predetermined distance or longer on a road not stored. Thus, road data can be prevented from being generated, for example, when the relevant vehicle runs on a parking lot connecting to a stored road.

In the above-mentioned embodiment, when the relevant vehicle runs on a road not contained in map data, road data on that road is generated. Instead, the following constitution may be adopted: trails of running are determined and only displayed. More accurate trails of running than conventional can be computed and displayed by determining the trails of running by the above-mentioned technique.

In the above-mentioned embodiment, when the relevant vehicle runs on a road corresponding to the generated road data in the direction opposite the stored trafficable direction, the restriction information on one-way traffic as an attribute is cleared and the attribute is corrected to two-way trafficable. In addition, there may be provided an instruction switch that is "coming-home" switch for giving an instruction to provide guidance to take the same route for homeward journey as the route that was used for outward journey. After departing from a driver's home and arriving at a predetermined destination, the switch is used when the driver desires to come home by the same route as the route to the destination. Here, the attribute included in the generated road data and associated with trafficable direction may be corrected based on the operation of this instruction switch.

That is, such a construction that the following operation is performed may be adopted: in a case where road data was generated when the relevant vehicle runs on a route for outward journey and the instruction switch is operated, the attribute of the generated road data is corrected into the attribute indicating two-way trafficable; at the same time, the automobile navigation system takes a route including the road corresponding to the generated road data as a guided route for homeward journey. The reason for this is as follows: it can be understood that, when the user drove on a road corresponding to the generated road data, he/she recognized the road to be a two-way trafficable road and gives an instruction to set the same guided route as the route for outward journey.

To exercise more care, the following constitution may be adopted: when a route including the road corresponding to the generated road data is set as a guided route for homeward journey, the user is asked whether the road corresponding to the road data is two-way trafficable; when the user makes a response indicating "trafficable," the attribute of the road data related to trafficable direction is corrected.

In the above-mentioned embodiment, when it is determined that the relevant vehicle runs on a road not contained in road map data, road data corresponding to that road is generated and stored in the map data R/W device 6. In addition, the user may be asked whether to store the generated road data before it is stored in the map data R/W device 6. Thus, the user can refuse the storage of the road data, for example, when he/she does not know that he/she drove on the road. As a result, unnecessary or inaccurate road data can be positively prevented from being stored.

In the above-mentioned embodiment, the value of capacity for storing position information on relevant vehicle positions and map matching positions is preset; when the data amount of position information reaches the upper limit value of the capacity value, the oldest position information data is deleted. Instead, position information on relevant vehicle positions and map matching positions may be thinned out and deleted according to a predetermined rule to ensure a storage area for storing the latest position information. Concrete examples of preferable rules for thinning out and deletion include the following: a predetermined number of pieces of data is thinned out and deleted from the oldest position history information; and an aggregate of data that can be considered to be straight lines is identified, and the data is thinned out and deleted. Here, when the relevant vehicle comes back to a point of comeback, it may be determined whether the stored position history information is sufficient for determining the trail of running of the vehicle from departure to comeback. Furthermore, direction information may be stored together as position history information so that any change in traveling direction can be easily recognized.

As mentioned above, specific position information of position history information is thinned out and deleted. This operation can be performed when the relevant vehicle is considered to be running on a road not contained in road map data. That is, when there is a road to be a target of map matching and map matching positions are continuously determined, the position history information need not be thinned out or deleted. This is because position history information will be required to determine a trail of running of the relevant vehicle or to generate road data when it is running on a road not stored.

In the above-mentioned embodiment, the following procedure is taken when there is a difference between the relevant vehicle position by high-accuracy positioning and the map matching position: the trail of running is determined based on corrected positions obtained by shifting the relevant vehicle position obtained by high-accuracy positioning by the amount equivalent to that difference; and road data is generated from this trail of running. Thus, road data can be added with respect to a road in existing road map data without producing a discontinuous portion or the like.

To obtain the same effect, instead of generated road data, existing road map data may be corrected so that it is shifted by the amount equivalent to the difference between the relevant vehicle position by high-accuracy positioning and the map matching position. In this case, the whole of the existing road map data may be corrected so that it is shifted by the amount equivalent to the difference between the relevant vehicle position by high-accuracy positioning and the map matching position. Or, the node at one end of a stored road at a point where a road on which road data was generated is connected may be corrected so that it is shifted by the amount equivalent to the difference between the relevant vehicle position by high-accuracy positioning and the map matching position.

Second Embodiment

Description will be given to an automobile navigation system in a second embodiment of the present invention. In the above-mentioned first embodiment, road data is generated in an automobile navigation system based on position information related to the relevant vehicle position and position information related to the map matching position. In this embodiment, this road data is acquired from an external management center that manages road map information.

Figure 10:
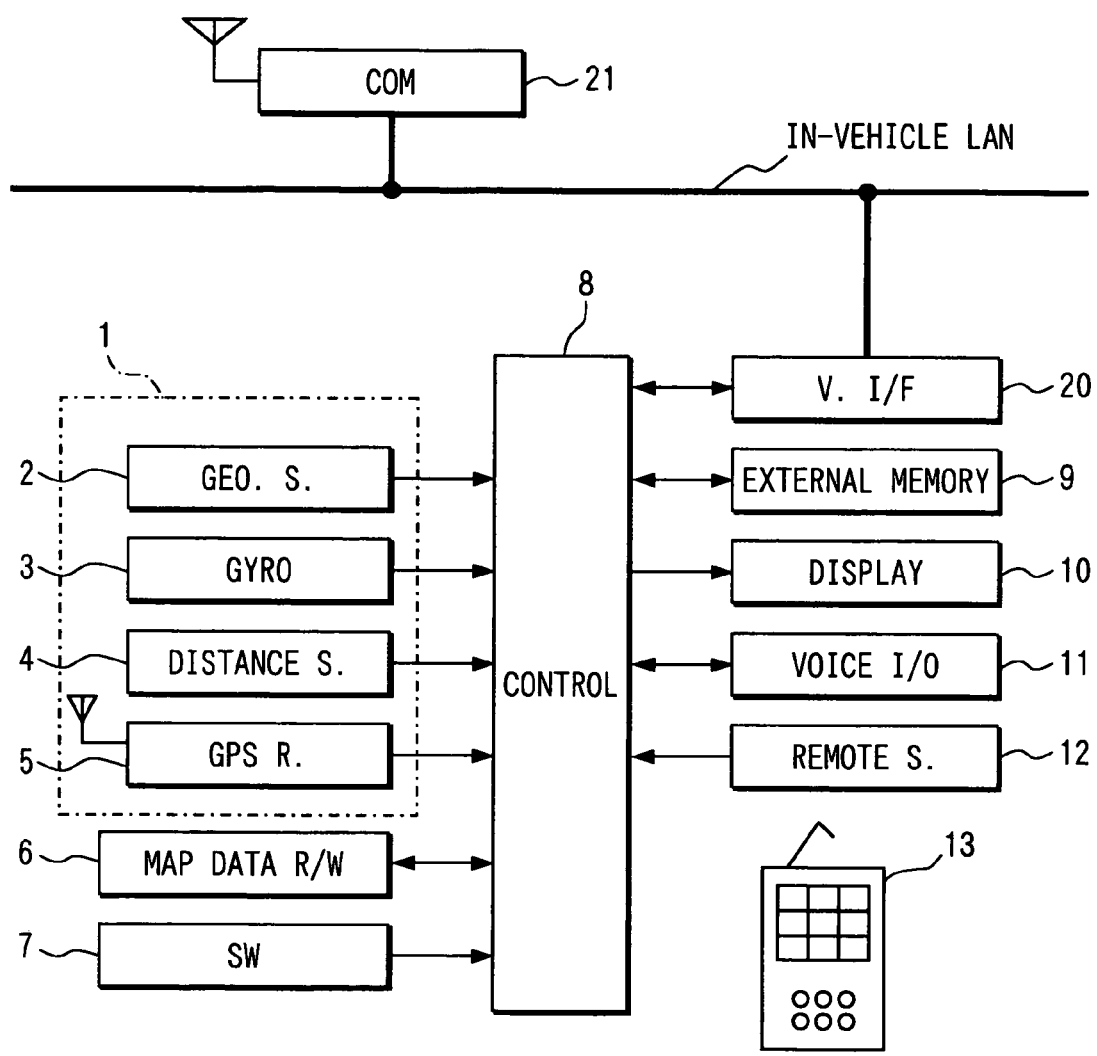
FIG. 10 is a block diagram illustrating the general configuration of an automobile navigation system in a second embodiment of the present invention.

FIG. 10 is a block diagram illustrating the configuration of an automobile navigation system in this embodiment. The same components as in the automobile navigation system in the first embodiment are marked with the same reference numbers.

As illustrated in FIG. 10, the automobile navigation system in this embodiment is additionally provided with a vehicle I/F 20 and a communication device 21 that are connected with an in-vehicle LAN for data communication with a management center, not shown. The other components are the same as in the automobile navigation system in the first embodiment, and the description of them will be omitted.

Figure 11:
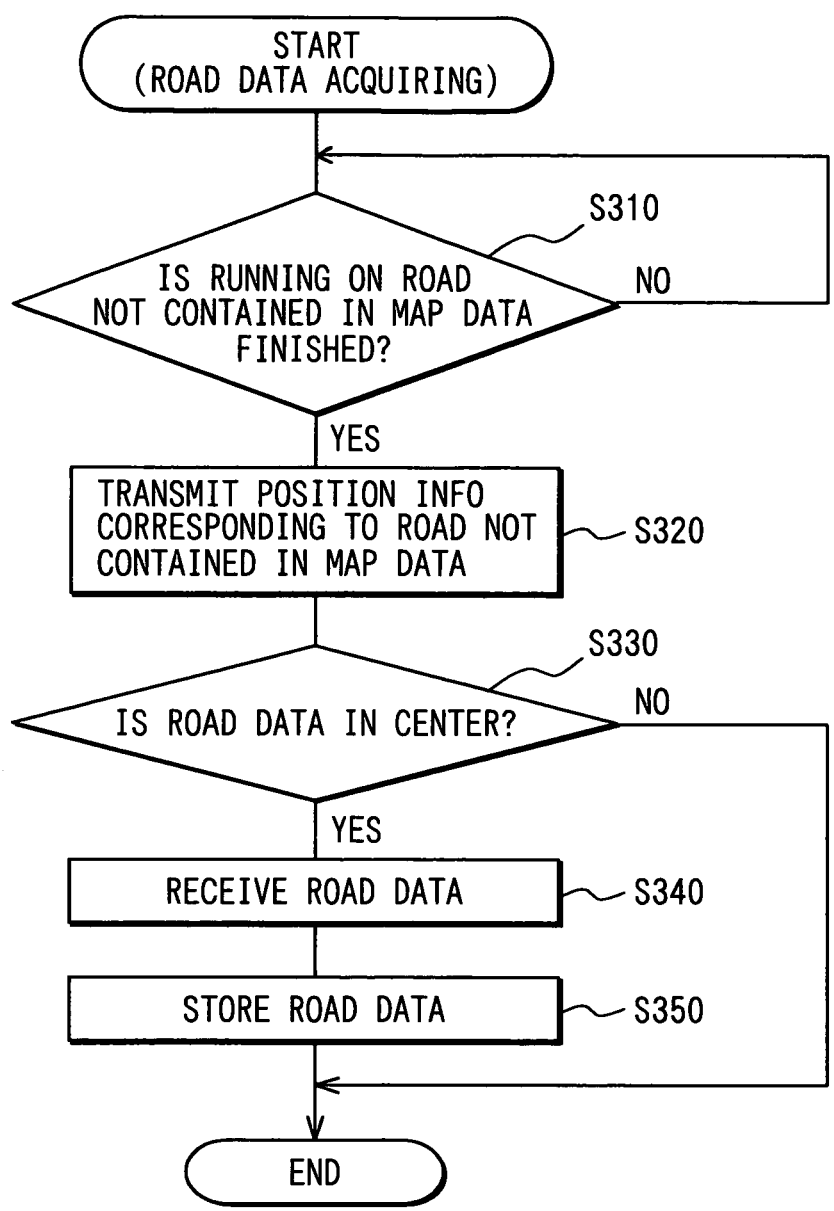
FIG. 11 is a flowchart illustrating a process carried out in an automobile navigation system in the second embodiment in which process road data is acquired from a management center and stored.

Description will be given to a process to acquire road data from a management center and store it with reference to the flowchart in FIG. 11. At Step S310 in FIG. 11, it is determined whether the relevant vehicle has finished running on a road not contained in map data. When it is determined that the relevant vehicle has finished running on a road not contained in map data, the operation proceeds to Step S320.

At Step S320, the automobile navigation system transmits relevant vehicle position information corresponding to the road not contained in map data to the management center through the vehicle I/F 20 and the communication device 21. Either or both of the following can be included in the relevant vehicle position information transmitted at this time: a history of position information on the relevant vehicle position computed based on position data obtained through measurement by the sensors of the position detector 1; and a history of position information related to map matching positions determined by map matching.

At Step S330, it is confirmed through communication with the management center whether road data corresponding to the transmitted relevant vehicle position information is stored in the management center. When the road data exists in the management center, the road data transmitted from the management center is received at Step S340 and the road data is acquired. At Step S350, the acquired road data is stored in the map data R/W device 6.

In this embodiment, the automobile navigation system only has to transmit relevant vehicle position information corresponding to roads not contained in map data. Therefore, the processing load on the automobile navigation system can be reduced, and further highly accurate road data can be acquired from a management center.

Description will be given to a process to update map data in a management center. The management center can provide each user with road data by acquiring the latest road maintenance information and periodically updating the road map data stored in the storage device in the management center.

However, it requires time and manpower to update road map data. Therefore, new road data may be generated based on relevant vehicle position information transmitted from the navigation system of each user, and road map data may be updated with the new road data. The method for generating road data based on relevant vehicle position information transmitted from the navigation system of each user is substantially the same as in the above-mentioned first embodiment. In case of management center, however, relevant vehicle position information can be acquired from the navigation systems of multiple users. For this reason, more accurate road data can be generated by generating road data from individual pieces of relevant vehicle position information and averaging the pieces of the obtained road data.

(Modifications)

Road data on roads not contained in map data may be generated in the automobile navigation system, and this road data may be transmitted as the above-mentioned relevant vehicle position information to a management center.

In a case where road data is transmitted as relevant vehicle position information and corresponding road data has been already stored in a management center, the following operation may be performed: the transmitted road data and the stored road data are compared with each other; and, when it is determined that the transmitted road data is insufficient in accuracy, the more accurate road data is transmitted from the management center to the automobile navigation system.

A process in the above embodiments may be executed using a CPU, a ROM, and the like. Here, steps in the process may be constructed as means or units in program stored in the ROM.

It will be obvious to those skilled in the art that various changes may be made in the above-described embodiments of the present invention. However, the scope of the present invention should be determined by the following claims.

What is claimed is:

1. A navigation system provided in a vehicle, the system comprising:

a display device;

a position detector that detects a position of the vehicle as a detection position, wherein the position detector is further configured to carry out at least two positioning types different in accuracy of (i) high-accuracy positioning having a relatively high accuracy and (ii) low-accuracy positioning having a relatively low accuracy;

a map data storage unit that stores road map data;

a map matching unit that performs map matching that matches, based on the detection position and the road map data, the detection position with a point of a road in the road map data, wherein the point is defined to be a map matching position;

a display control unit that causes the display device to display the map matching position together with a road map based on the road map data:

a history storage unit, configured to store position history information, wherein (i) the position history information includes only position information related to the detection position when the high-accuracy positioning is carried out, and (ii) the position history information includes position information related to the detection position and position information related to the map matching position when the low-accuracy positioning is carried out;

a determination unit that, when the vehicle runs on a not-stored road that is not stored in the road map data, determines a trail of running of the vehicle from departure to comeback based on the position history information, wherein the departure is to depart from a first stored road that is stored in the road map data while the comeback is to back into a second stored road that is stored in the road map data; and a road data generation unit that generates road data corresponding to the trail of running determined by the determination unit and adds the generated road data to the road map data, wherein, when a certain detection position detected when the high-accuracy positioning is carried out is stored in the history storage unit and the certain detection position is different from a map matching position corresponding to the detection position, the road data generation unit calculates a difference between the certain detection position and the corresponding map matching position as a correction vector for the trail of running related to the certain detection position, and the road data generation unit corrects, based on the calculated correction vector, either (i) the generated road data corresponding to the trail of running related to the certain detection position detected when the high-accuracy positioning is carried out or (ii) road map data to which the generated road data is attached.

2. The navigation system according to claim 1, wherein, when the low-accuracy positioning is carried out, the history storage unit pairs the detection position and the map matching position corresponding to the detection position with each other in the position history information.

3. The navigation system according to claim 1, wherein, when generating the road data, the road data generation unit inquires of a user whether the generated road data should be added, and wherein, when the user gives an instruction to add the generated road data, the road data generation unit adds the generated road data to the road map data.

4. The navigation system according to claim 1, wherein the road data generation unit gives to the generated road data an attribute for indicating a direction in which the vehicle actually ran as a trafficable direction.

5. The navigation system according to claim 4, wherein, when the vehicle runs on a road corresponding to the generated road data in a direction opposite the trafficable direction, the road data generation unit corrects the attribute of the road data to an attribute that indicates that the road is two-way trafficable.

6. The navigation system according to claim 4, further comprising:

an instruction unit that gives an instruction to provide guidance to take for homeward journey a same route as a route for outward journey; and a guidance unit that sets the same route for the homeward journey as a guided route under the instruction and provides routing assistance, wherein, in a case where the road data is generated with the attribute given and an instruction is given by the instruction unit, the road data generation unit corrects the attribute to indicate two-way trafficable.

7. The navigation system according to claim 1, wherein, when the history storage unit stores the position history information including both the position information related to the detection position and the position information related to the map matching position, the determination unit determines a point of the departure from the first stored road that is a target of map matching based on an angle difference between an orientation of the first stored road and a traveling direction determined from the position information related to the detection position.

8. The navigation system according to claim 1, wherein, when the history storage unit stores the position history information including both the position information related to the detection position and the position information related to the map matching position, the determination unit determines a point of the comeback into the second stored road that is a target of map matching based on an angle difference between an orientation of the second stored road and a traveling direction determined from the position information related to the detection position.

9. The navigation system according to claim 1, wherein, when a state in which there is no road to be a target of map matching lasts for a predetermined period and thereafter a detection position agrees with a position on the second stored road, the determination unit regards the vehicle as having run on the not-stored road and then determines the trail of running of the vehicle.

10. The navigation system according to claim 1, wherein, when a data amount of the stored position history information reaches a predetermined amount, the history storage unit replaces chronologically oldest data with latest data.

11. The navigation system according to claim 1, wherein, when a data amount of the stored position history information reaches a predetermined amount, the history storage unit thins out and deletes a portion of the stored position history information according to a predetermined rule, thereby ensuring a storage area of the history storage unit.

12. The navigation system according to claim 11,
wherein the thinning out and deletion of the portion of the stored position history information are carried out in the history storage unit when the vehicle is running on the not-stored road.

13. The navigation system according to claim 11,
wherein the determination unit includes a judgment unit that judges, when the vehicle comes back to the second stored road, whether the history storage unit holds position history information required for determining the trail of running of the vehicle from the departure to the comeback, and
wherein, when the history storage unit is determined to hold the position history information required for determining, the determination unit determines the trail of running of the vehicle.

\* \* \* \* \*